Jan. 28, 1958  I. R. MARKS  2,821,361
PNEUMATIC TIRE SPREADER
Filed June 1, 1955  3 Sheets-Sheet 1

INVENTOR.
IVAN R. MARKS
BY *Victor J. Evans & Co.*
ATTORNEYS

Jan. 28, 1958 I. R. MARKS 2,821,361
PNEUMATIC TIRE SPREADER
Filed June 1, 1955 3 Sheets-Sheet 2
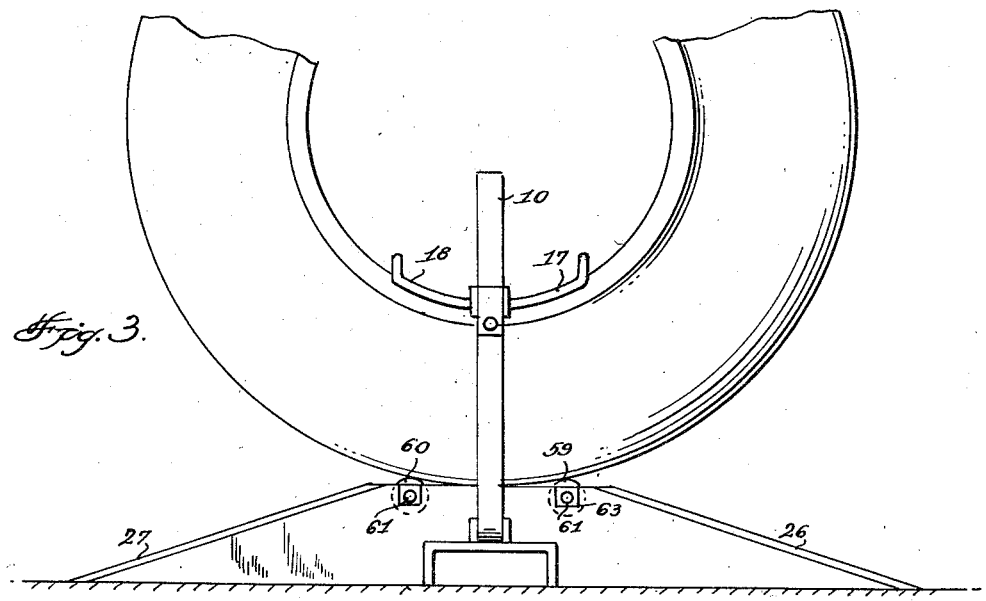
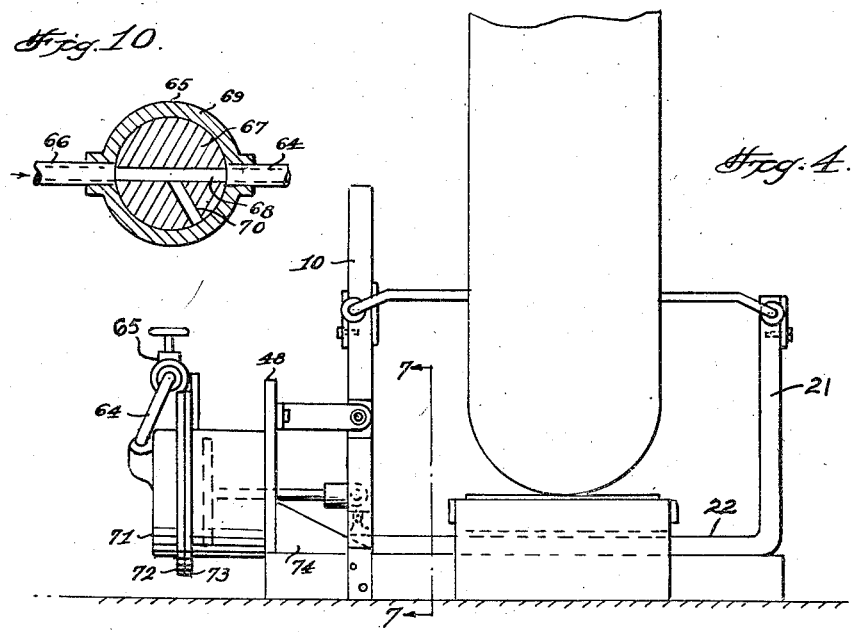
INVENTOR.
IVAN R. MARKS
BY Victor J. Evans & Co.
ATTORNEYS

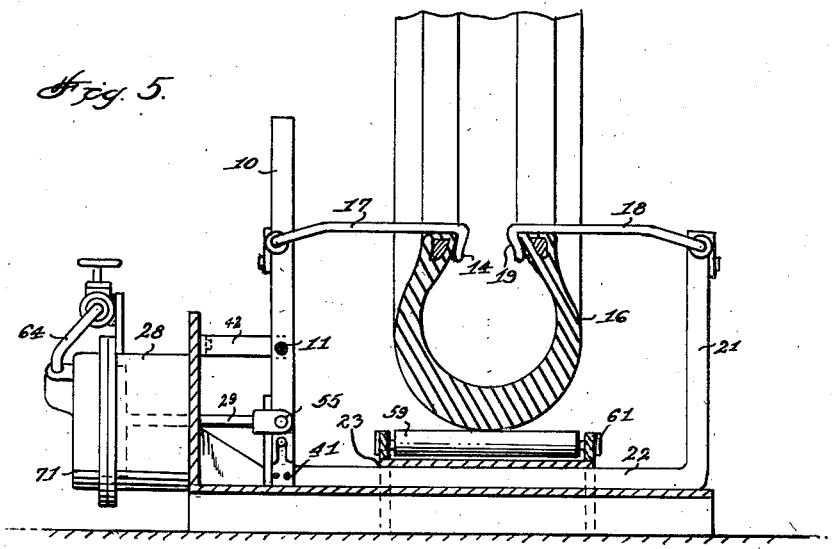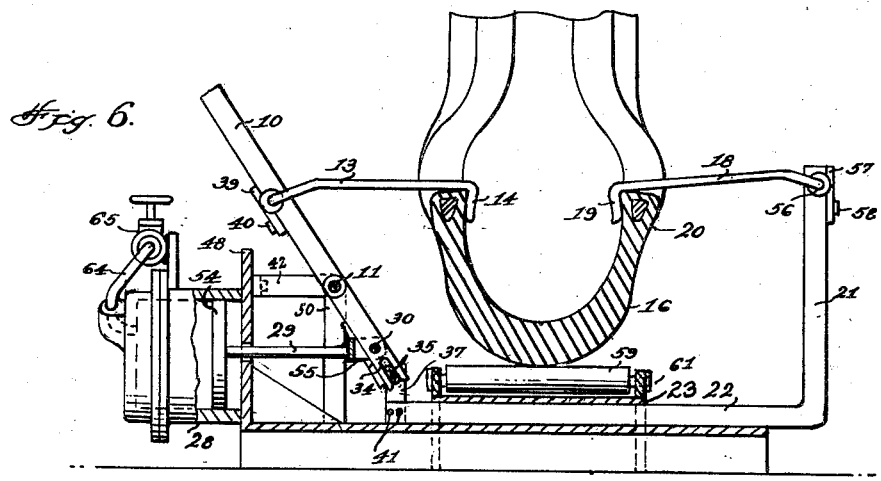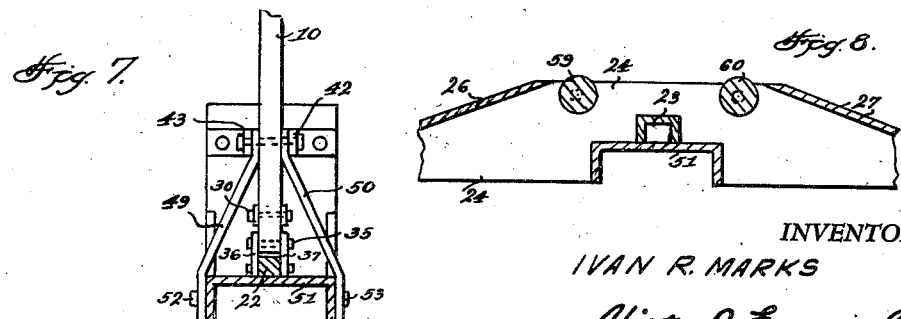

United States Patent Office 2,821,361
Patented Jan. 28, 1958

2,821,361

PNEUMATIC TIRE SPREADER

Ivan R. Marks, Williams, Calif.

Application June 1, 1955, Serial No. 512,397

4 Claims. (Cl. 254—50.3)

This invention relates to tools for repairing tires of motor vehicles and particularly tires of pleasure cars, trucks and trailers.

An object of this invention is to provide an improved tire spreading tool that is adapted to be positioned on a floor or the like so that tires may be rolled thereon.

Another object of the invention is to provide an improved tire spreading tool that operates on both side walls of a tire whereby with the tire in a vertical position the walls are spread evenly on both sides of the center.

Another important object of the invention is to provide a tire spreading tool in which operating means for spreading both sides of a tire is actuated by a cylinder and lever positioned on one side of the tire so that a tire is adapted to be spread from both sides with a single operator, and in one operation.

A further object of the invention is to provide an improved tool for spreading motor vehicle and particularly truck tires in which the tool is of a simple and economical construction.

Other features and advantages of the invention will appear from the following description, taken in connection with the drawings, wherein:

Figure 3 is a side elevational view of the tool looking toward the side opposite to that shown in Figure 1.

Figure 4 is an end elevational view of the tool.

Figure 5 is a cross section through the tool, taken on line 5—5 of Figure 2, showing tire gripping fingers extended over beads on the edges of side walls of a tire.

Figure 6 is a cross section, similar to that shown in Figure 5, showing the device with pressure applied to the cylinder wherein the fingers are actuated to spread the tire.

Figure 7 is a cross section through a portion at one side of the tool, being taken on line 7—7 of Figure 4.

Figure 8 is a longitudinal section, taken on line 8—8 of Figure 2, with parts omitted and with the ends of the platform broken away.

Figure 10 is a cross section through a three way valve through which fluid under pressure is supplied to the cylinder, the core of the valve being positioned to supply fluid under pressure to the cylinder and the parts being shown on an enlarged scale.

Figure 1:
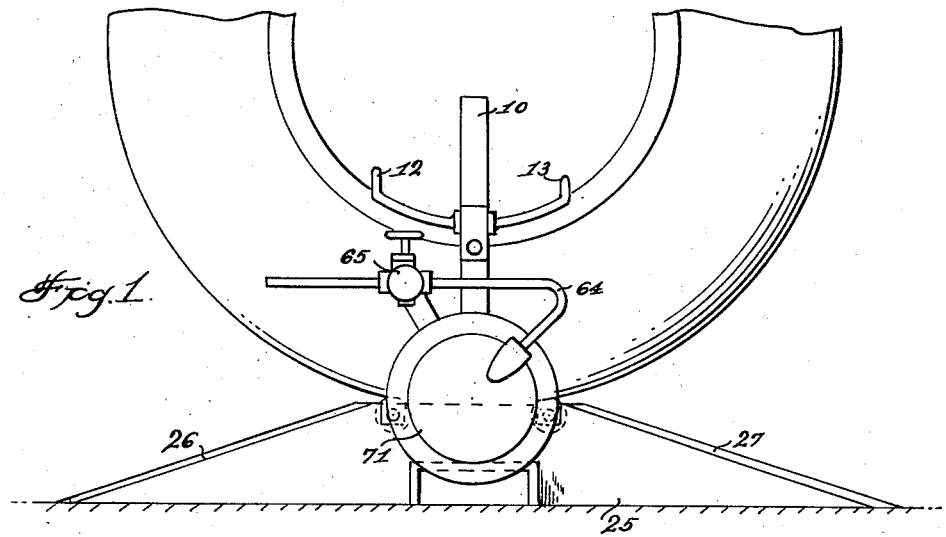
Figure 1 is a side elevational view of the tire spreading tool, said view looking toward the side of the tool on which the fluid pressure cylinder is positioned.
Figure 2:
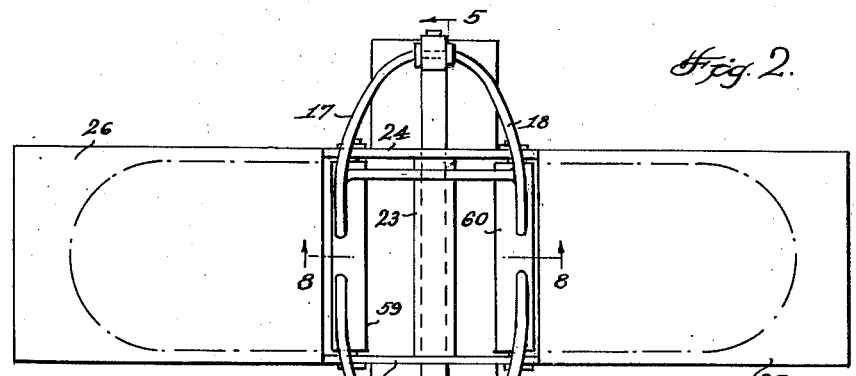
Figure 2 is a plan view of the tool.
Figure 9:
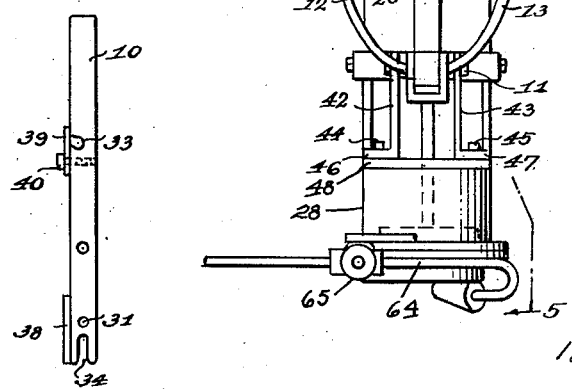
Figure 9 is a view showing the operating lever with other parts omitted.

Referring now to the drawings, wherein like reference characters denote corresponding parts, the improved tire spreading tool of this invention includes a lever 10 pivotally mounted on a shaft 11, fingers 12 and 13 mounted on the lever and having tips 14 positioned to extend over a bead 15 of a tire 16, fingers 17 and 18 having tips 19 adapted to extend over a bead 20 of the tire, an L-shaped bracket having a vertically disposed leg 21 and a horizontally disposed arm 22, the arm 22 extending through a socket 23 in a platform having side walls 24 and 25 and inclined end sections 26 and 27, and a fluid pressure cylinder 28, a piston rod 29 of which is pivotally connected to the lever 10 with a pin 30.

The lever 10 is provided with an opening 31 in which the pin 30 is positioned, at opening 32 through which the shaft 11 extends, a recess 33 through which the connecting section of the fingers 12 and 13 extends, and a slot 34 extended upwardly from the lower end and which is positioned over a pin 35 mounted in bars 36 and 37 extended upwardly from the end of the arm 22 of the L-shaped bracket that supports the fingers 17 and 18. The lower end of the lever is provided with a reinforcing plate 38, and a cover plate 39, positioned to cover the recess 33, is pivotally attached to the lever with a pin 40. The bars 36 and 37 are secured to the arm 22 by rivets or pins 41, although it will be understood that the bars may be integral with the arm or secured thereto by other means.

The shaft 11 on which the lever 10 is pivotally mounted is supported with brackets 42 and 43 secured by bolts 44 and 45 in flanges 46 and 47, respectively, to an upright 48, and the extended ends of the arms 42 and 43 are supported by braces 49 and 50 extended downwardly from the brackets 42 and 43 and secured to flanges of a channel shaped section 51 with bolts 52 and 53.

The piston rod 29 extends from a piston 54 in the cylinder 28 and a clevis 55 on the extended end is mounted on the pin 30.

The upper end of the vertically disposed leg 21 of the L-shaped bracket is also provided with a recess, as indicated by the numeral 56, similar to the recess 33, and the recess 56, through which the connecting section of the fingers 17 and 18 extends, is provided with a cover plate 57 that is pivotally mounted with a pin 58 on the outer surface of the leg 21.

The platform is provided with rollers 59 and 60 which are rotatably mounted with pins 61 in the side plates 24 and 25 of the platform, the pins being positioned in bearing blocks 62 that are mounted in slots 63, as shown in Figure 3, and with the rollers 59 and 60 positioned as shown tires may be rolled upwardly on the inclined panels 26 and 27 so that they rest upon the rollers and with the tire positioned on the rollers the tips of the fingers 12 and 13 on one side and 17 and 18 on the other are adapted to extend over the beads 15 and 20 of the tire whereby with pressure applied through the cylinder 28 the lever 10 is actuated from the position shown in Figure 5 to that shown in Figure 6, whereby the side walls of the tire are spread.

The cylinder 28 is supplied with fluid under pressure from a storage tank, compressor or the like through a tube 64 which extends from one side of a three way valve 65 which, being formed as illustrated in Figure 10, is provided with an inlet connection 66 which supplies fluid through a core 67 to the tube 64, connecting the valve to the cylinder, and with the device actuated by fluid under pressure whereby the gripping fingers move from the position shown in Figure 5 to that shown in Figure 6 the core of the valve is turned until the parts are locked in position. When it is desired to release the tire, the core 67 is rotated until one end of a passage 68 registers with an opening 69 and a branch connection 70 registers with the connection 64. By this means fluid under pressure in the system is released to the atmosphere through the opening 69.

The cylinder 28 is provided wtih a head 71 to which the connection 64 is connected and the head is secured to the cylinder with flanges 72 and 73. The plate or flange 48 at the opposite end of the cylinder is reinforced with gusset plates 74, as shown in Figure 4.

With the parts assembled as illustrated and described and with the valve 65 connected to a reservoir or means for supplying fluid under pressure, a tire may be rolled upon the rollers 59 and 60 of the platform and with the tire in position, as shown in Figure 1, the valve 65 is opened whereby the fingers positioned with tips thereof over the beads of the tire are drawn outwardly by the lever and bracket so that the walls of the tire are spread, as illustrated in Figure 6, thereby facilitating inspection of the inner surface of the tire and making it possible to readily apply a boot or the like to the inner surface of the tire. The tire is readily released by turning the valve to a position whereby the fluid under pressure is released to the atmosphere.

With the lever 10 pivotally mounted on the shaft 11 and with the fingers 12 and 13 connected to the lever above the pivot point and the fingers 17 and 18 connected below the pivot point, the same lever and also the same pressure cylinder actuate the fingers whereby the fingers on both sides of the tire are drawn outwardly in the same action.

With this tool it is not necessary to raise the tire upon a platform or stand and to facilitate movement of the tire on the device additional rollers, such as the rollers 59 and 60, may be used and the rollers may be power driven or operated by suitable means.

Although it is preferred to use a pneumatic cylinder and operate the lever with compressed air, it will be understood that other fluids, such as oil may be used.

It will be understood that modifications, within the scope of the appended claims, may be made in the design and arrangement of the parts without departing from the spirit of the invention.

What is claimed is:

1. A tire spreader comprising a platform, a vertically disposed lever pivotally mounted on the platform, said platform having a socket thereon extending transversely thereof and L-shaped bracket slidably mounted in the socket on the platform and pivotally connected to the lever at a point spaced below the pivotal mounting thereof, fingers attached to the bracket and adapted to extend over the edge of a wall of a tire positioned on the platform, similar fingers pivotally connected to the lever at a point spaced above the pivotal mounting thereof and adapted to extend over the side wall of a tire positioned on the platform, and pressure means for operating the lever to actuate the fingers to spread the side walls of the tire.

2. A tire spreader comprising a platform having inclined end sections, a vertically disposed lever pivotally mounted on the platform, said platform having a socket thereon extending transversely thereof an L-shaped bracket slidably mounted in the socket on the platform and pivotally connected to the lever at a point spaced below the pivotal mounting thereof, fingers attached to the bracket and adapted to extend over the edge of a wall of a tire positioned on the platform, similar fingers pivotally connected to the lever at a point spaced above the pivotal mounting thereof and adapted to extend over the side wall of a tire positioned on the platform, and pressure means for operating the lever to actuate the fingers to spread the side walls of the tire.

3. A tire spreader comprising a platform having inclined end sections, a vertically disposed lever pivotally mounted on the platform, said platform having a socket thereon extending transversely thereof an L-shaped bracket slidably mounted in the socket on the pltaform and pivotally connected to the lever at a point spaced below the pivotal mounting thereof, fingers attached to the bracket and adapted to extend over the edge of a wall of a tire positioned on the platform, similar fingers pivotally connected to the lever at a point spaced above the pivotal mounting thereof and adapted to extend over the side wall of a tire positioned on the platform, and a fluid pressure cylinder positioned on the platform and having a piston rod connected to said lever for actuating the lever to spread the walls of a tire on the platform.

4. In a motor vehicle tire spreader, the combination which comprises a platform having transversely positioned spaced rollers in the upper surface with inclined end sections extended downwardly from the rollers, a vertically disposed lever pivotally mounted on the platform, said platform having a socket thereon extending transversely thereof below and intermediate of said rollers an L-shaped bracket slidably mounted in the socket on said platform and pivotally connected to the lever at a point spaced below the pivotal mounting thereof, fingers with tips on extended ends pivotally connected to the lever and bracket and positioned to extend over side walls of a tire positioned on the rollers of the platform, the fingers connected to the lever being connected at a point spaced above the pivotal mounting thereof, a fluid pressure cylinder mounted on the platform, a valve for controlling a supply of fluid under pressure to the cylinder, said cylinder having a piston therein with a connecting rod extended from the piston, and means for pivotally connecting the extended end of the connecting rod to the lever at a point spaced below the pivotal mounting of the lever.

References Cited in the file of this patent

UNITED STATES PATENTS

| | | |
|---|---|---|
| 1,990,611 | Mutchler | Feb. 12, 1935 |
| 2,310,891 | Branick | Feb. 9, 1943 |
| 2,375,595 | Stoehr | May 8, 1945 |
| 2,496,389 | Goodman | Feb. 7, 1950 |